W. H. Baxter,
Grain Meter.
No. 113,133.  Patented Mar. 28, 1871.
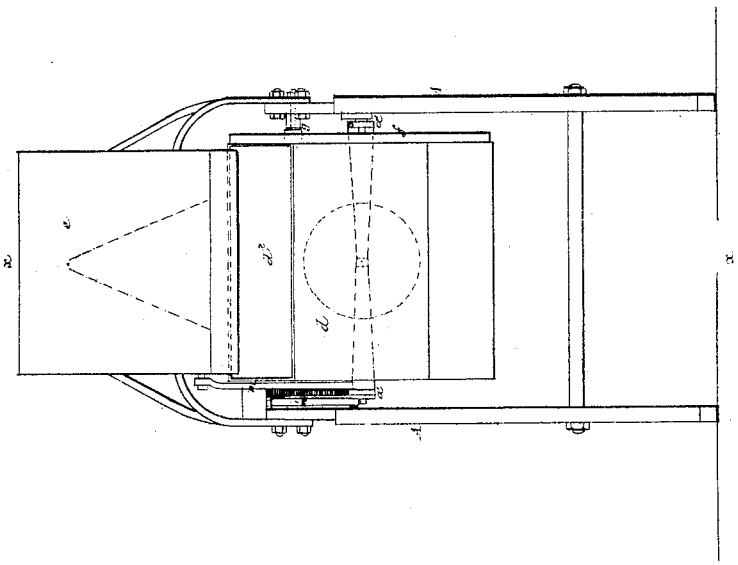
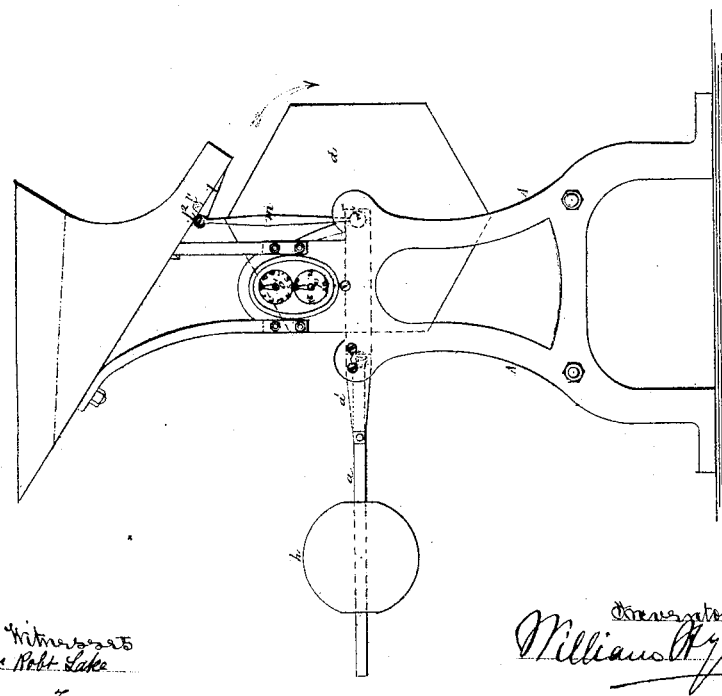

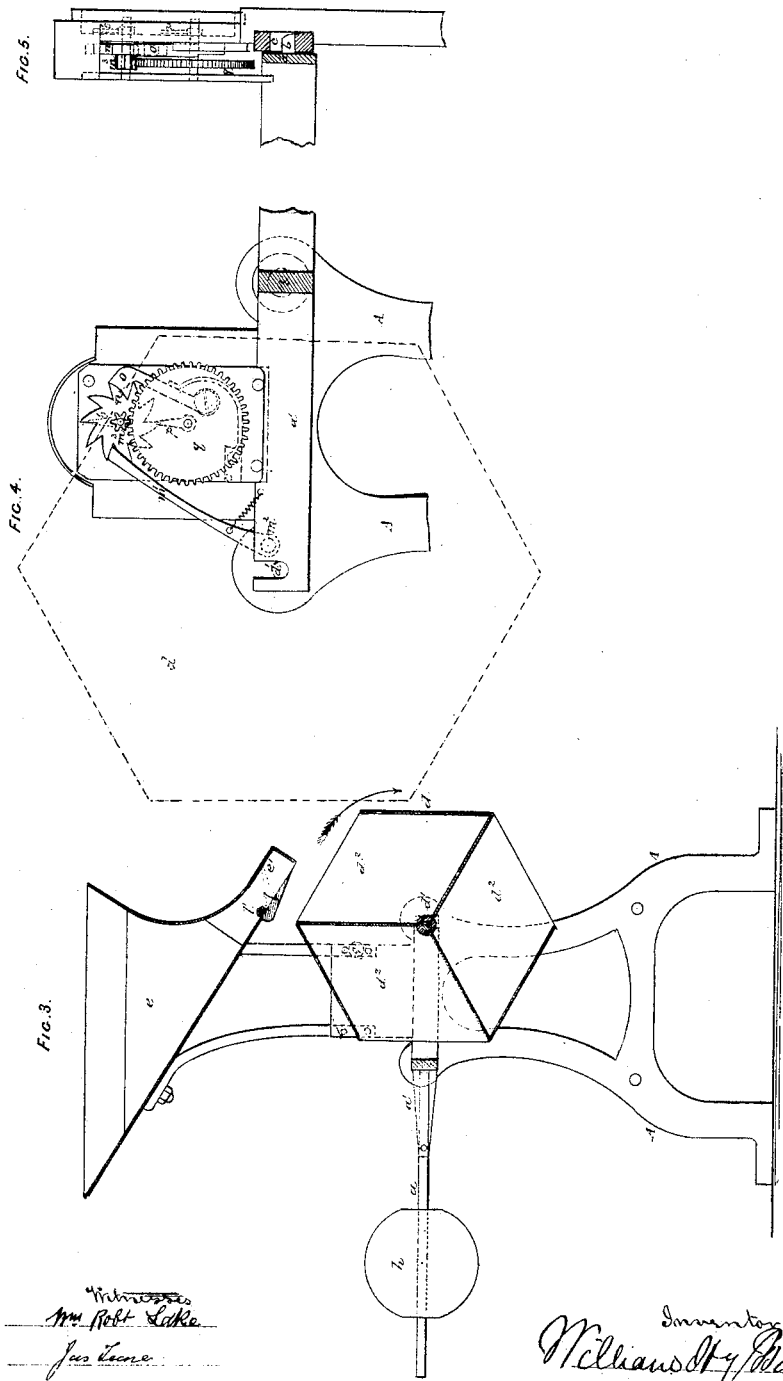

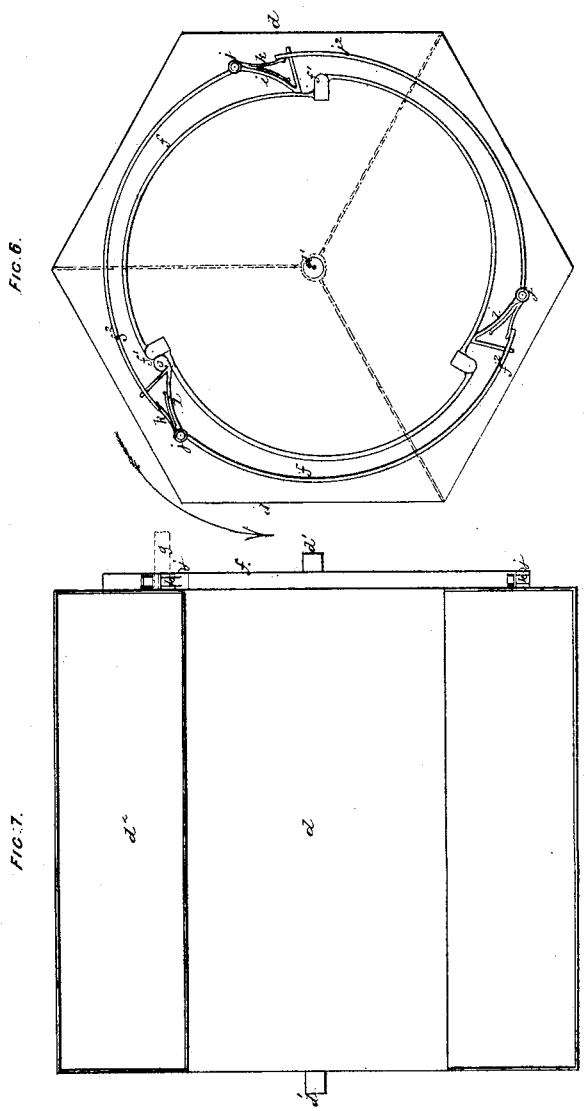

UNITED STATES PATENT OFFICE.

WILLIAM HENRY BAXTER, OF BRIXTON HILL, COUNTY OF SURREY, ENGLAND.

IMPROVEMENT IN GRAIN-WEIGHING REGISTERS.

Specification forming part of Letters Patent No. 113,133, dated March 21, 1871.

*To all whom it may concern:*

Be it known that I, WILLIAM HENRY BAXTER, of Brixton Hill, county of Surrey, England, have invented certain Improvements in Weighing and Measuring Machines, of which the following is a specification.

The object of my invention is the production of a cheap and efficient self-acting machine which may be used for weighing and measuring either solid or liquid substances, and which will indicate the quantities weighed or measured on a dial or other suitable registering apparatus.

In the drawings, Figure 1 is a side elevation of my improved machine. Fig. 2 is a front elevation of the same. Fig. 3 is a section on the line $x\,x$, Fig. 2. Figs. 4, 5, 6, and 7 show parts of the said machine, drawn to an enlarged scale.

Like letters indicate the same parts throughout the drawings.

A is the frame of the machine, which is made strong enough to afford a firm support to the mechanism, and which may be made of wood or metal. The beam $a$ of the machine, which may also be made either of wood or metal, is supported by fulcrum-pins or knife-edges $b$, which have their bearings in holes or sockets $c$ in the sides of the frame A. The said beam is forked or formed with two bars, $a'$, which have the drum $d$ inclosed between them. The said drum has journals $d'$, which are supported to turn freely in bearing formed in the ends of the bars $a'$. The said drum is divided into three or more compartments, $d^2$, as shown in Fig. 3. These compartments receive the grain or other substance to be weighed and measured, and the drum and other parts of the machine are so constructed and arranged that when one compartment has received the proper quantity of any substance the drum will turn upon its axis and discharge the contents from the said compartment, and at the same time present another compartment to be filled, the quantity thus received and discharged in any number of revolutions of the drum being indicated by the registering apparatus. These results are accomplished by the following devices and arrangements of mechanism.

Above the drum $d$ is a hopper, $e$, which has a chute or spout, $e'$, arranged in the proper position to discharge the contents of the hopper into that compartment of the drum which is on the side of a vertical line drawn through the center of the said drum. The drum is held while receiving the grain, and released so that it may discharge the same, by means of the grooved cam $f$ on the drum $d$, and the stop $g$, fixed on the frame A. The said cam is preferably fixed on the drum at the side of the machine opposite to that at which the indicating apparatus is placed. As shown in Fig. 6, the groove has three shoulders, $f'$, which divide the cam into as many parts as there are compartments in the drum. When the said drum is held up by the weight while one of the compartments is receiving its charge, the shoulder $f'$ corresponding with such compartment is in contact with the pin $g$, and the drum is thereby kept from turning on its axis. When, however, the proper quantity to be weighed or measured has been received in the said compartment, and the drum overbalances the weight $h$, the said drum is lowered and the groove adjusted to bring the part $f^2$ opposite the pin $g$. The drum $d$ then, having its freedom of rotation no longer restrained, and having nothing to counterbalance the weight of the compartment which has been filled, immediately turns over, carrying the loaded compartment to the lowest position, the load being discharged and the drum arrested by the stop $g$ in the proper position to have the next chamber filled. The pawls $i$, which are pivoted to the cam at $j$, and which are kept down upon the inner periphery of the groove by the light springs $k$, are used to prevent the recoil or reaction of the drum, which might be caused to take place sometimes when the shoulders $f'$ strike the pin $g$. It will be seen that these pawls $i$ are so formed and arranged that they offer no obstruction to the turning of the drum $d$ in the proper direction, which direction is indicated by the arrows in Figs. 1, 3, and 6.

I may modify my invention by using, instead of these safety-pawls, some equivalent device for preventing the recoil of the drum, or I may dispense altogether with any such devices for preventing the recoil of the drum.

The shoulders $f'$ should be of steel and hardened.

The valve $l$ of the hopper $e$ is hinged or jointed at $l'$, and has a short arm, $l^2$, to which is connected one end of the rod $m$, whose lower end is connected to the drum-spindle. By this arrangement it will be seen that the valve will be closed when the drum descends, and when the drum rises the said valve will be opened.

The arrangement of the mechanism of the indicating apparatus is illustrated in detail in Figs. 4 and 5. $m'$ is a spring-pawl, which is jointed at $m^2$ to the beam $a$, and which is arranged to take into the teeth of the ratchet-wheel $n$ and turn it one tooth forward at each upward movement of the drum. Another spring-pawl, $o$, acts as a brake to keep the wheel $n$ from turning, except as it is actuated by the pawl $m'$. If desired, only one dial may be used; but I prefer to have two, as shown in Fig. 1. It will be seen that this wheel and pinion are fixed on the axis of the indexes $o'$ and $p$, and that the wheel $n$ is geared by a pinion, $m^3$, with the wheel $q$, so that both indexes are actuated together, the relative proportions of the wheel and pinion being such as to insure the indication of the correct weights or measures on each dial.

In the drawings I have shown a sliding weight, $h$, upon the beam for regulating the quantity passed through the machine at each descent of the drum; but in some cases I use an ordinary scale-pan and weights, or any other convenient arrangement of weighing mechanism.

Where measure and not weight is required, it is only necessary to weigh a known bulk first, and weight the beam or scale-pan accordingly.

The action of the machine is as follows: The weight of the quantity or measure requiring to be registered having been fixed, the beam is weighted to that quantity, and the index may be placed at zero. The corn or other substance is fed into the hopper by elevators by manual labor or otherwise, and falls into that one of the compartments $d^2$ ready to receive it until the scale turns. The drum then descends until it is clear of the stop or stops $g$ on the frame, at the same time closing the valve and cutting off the supply. The drum then turns over and the contents of the compartment are discharged, the drum at the same moment presenting another compartment to the mouth of the chute to be filled. The drum being then returned by the weight, opens the valve $l$, and the operations are repeated.

I claim as my invention—

1. The grooved cam $f$, fixed on the end of the drum, with the shoulders $f'$, arranged to operate in combination with a pin or pins, $g$, fixed on the frame of the machine, substantially as set forth, for the purpose specified.

2. In combination with the above, the drum $d$, hopper $e$, provided with the cut-off mechanism described, and the registering device, when the same are constructed and operate together, substantially as and for the purpose specified.

WILLIAM HY. BAXTER.

Witnesses:
WM. ROBT. LAKE,
JAMES TEARE.